(No Model.)
T. M. KENNEY.
VELOCIPEDE.
No. 431,061. Patented July 1, 1890.
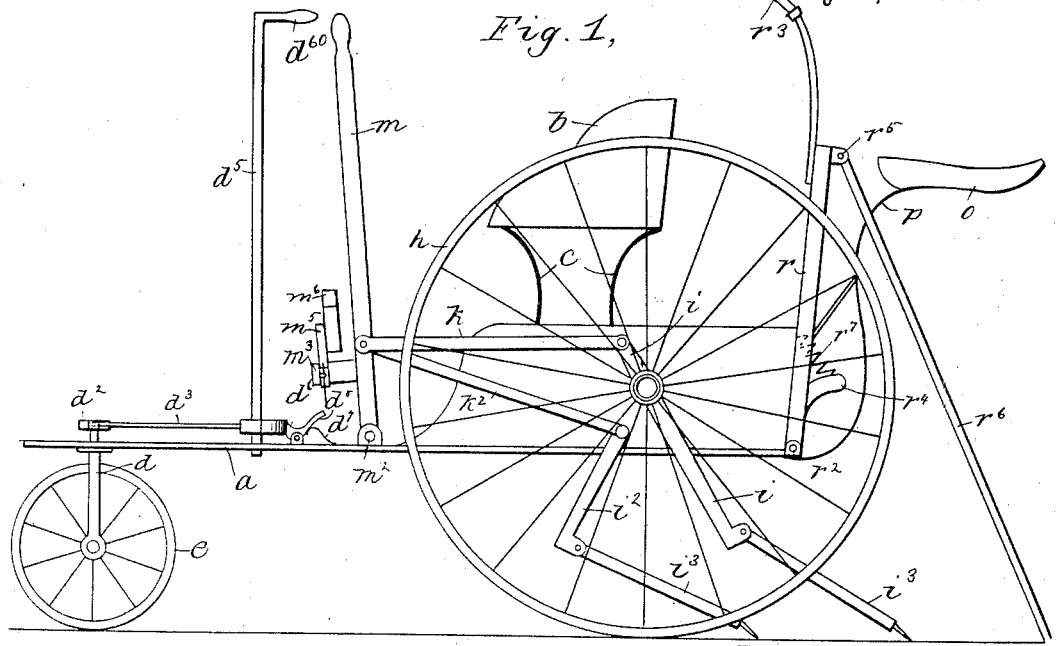
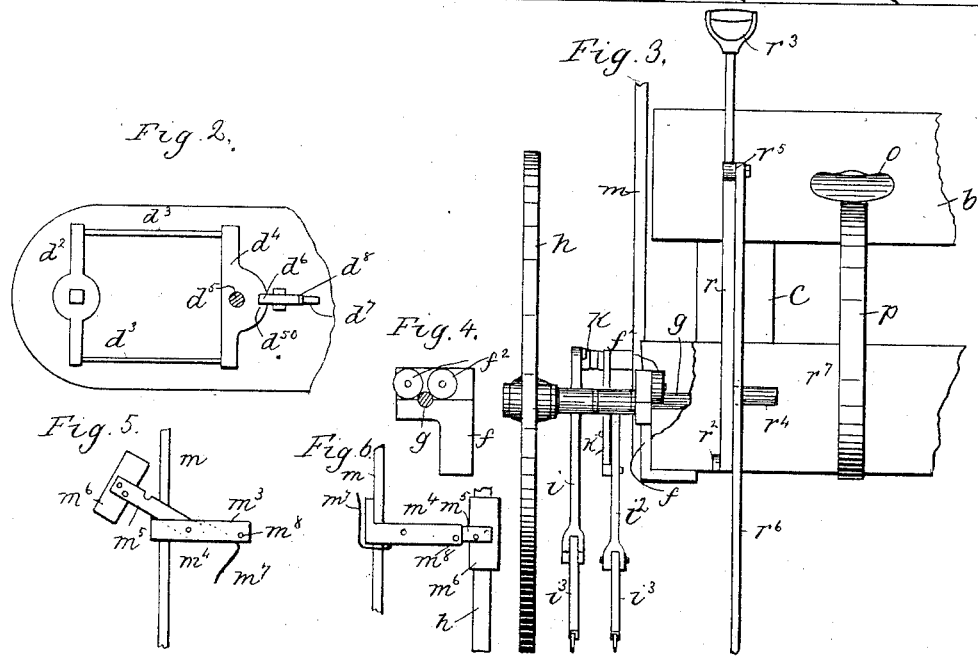
Witnesses,
Jas. J. Maloney
M. E. Hill
Inventor,
Thomas M. Kenney,
by Jos. P. Livermore
Att'y.

UNITED STATES PATENT OFFICE.

THOMAS M. KENNEY, OF CAMBRIDGE, MASSACHUSETTS.

VELOCIPEDE.

SPECIFICATION forming part of Letters Patent No. 431,061, dated July 1, 1890.

Application filed November 9, 1889. Serial No. 329,733. (No model.)

*To all whom it may concern:*

Be it known that I, THOMAS M. KENNEY, of Cambridge, county of Middlesex, and State of Massachusetts, have invented an Improvement in Velocipedes, of which the following description, in connection with the accompanying drawings, is a specification, like letters on the drawings representing like parts.

My invention relates to a velocipede especially intended to be impelled by two or more riders.

The invention is embodied in a vehicle of that class in which propulsion is effected by pushers which engage with the ground, being vibrated back and forth in the line of movement of the vehicle and engaging with the ground when moving in one direction with relation to the vehicle.

The invention consists, mainly, in details of construction of the actuating mechanism and other appliances, that will be hereinafter pointed out.

Figure 1 is a side elevation of a vehicle embodying this invention; Fig. 2, a plan view of the steering portion thereof; Fig. 3, a rear elevation of a portion of the vehicle; Fig. 4, a detail of the axle bearing or hanger, and Figs. 5 and 6 details of the brake mechanism to be referred to.

The vehicle comprises a main frame or platform $a$, from which a seat $b$ is supported upon C-shaped springs $c$, the said vehicle being shown in this instance as intended for two riders. The said platform is provided at its forward end with a pivoted fork $d$, having the bearing for the steering-wheel $e$, and near its rear end it is provided with hangers $f$, provided with anti-friction rollers $f^2$, (see Figs. 3 and 4,) upon which the axle $g$ has its bearing, said axle being provided at either side of the vehicle with large supporting-wheels $h$. Loose upon the axle $g$, between the wheel $h$ and the hanger $f$, are supported two levers $i\,i^2$, provided at their lower ends with push-rods $i^3$, which incline rearwardly and downwardly and are provided at their ends with suitable points for engaging with the ground.

The lever $i$ is extended above the axle $g$, and is connected at a point above the axle by a link $k$ with a lever $m$, pivoted at $m^2$ on the main frame of the vehicle, and provided with a handle in convenient position to be manipulated by the operator sitting at one end of the seat $b$. The lever $m$ is connected by a second link $k^2$ with the lever $i^2$ at a point below the axle, so that the vibration of the lever $m$ in one direction—forward, for example—throws the push-rod $i^3$, connected with the lever $i$, backward, tending to propel the vehicle forward, and draws the push-rod $i^3$, connected with the lever $i^2$, forward into position to make a backward or propelling stroke. Vibration of the lever $m$ in the opposite direction throws the push-rod $i^3$, connected with the lever $i^2$, backward, and draws the one connected with the lever $i$ forward, so that each stroke of the lever $m$ propels the vehicle. It is intended that there shall be a similar actuating mechanism at the other side of the vehicle for the rider at the other end of the seat $b$ to operate; but such mechanism is not shown, as it is a substantial duplication of that shown in Figs. 1 and 3.

As a further means of propulsion, when necessary, the vehicle is provided at the rear with a central seat or saddle $o$, supported on a spring $p$. At either side of said seat are mounted levers $r$, pivoted at $r^2$, and provided at their upper ends with handles $r^3$ and near their lower ends with pedals $r^4$. The said levers are connected at $r^5$ with push-rods $r^6$, the lower ends of which engage with the ground in such manner that when the lever is vibrated backward on its pivot $r^2$ the said push-rod will engage with the ground, and by re-action cause the vehicle to be propelled forward. By the combined action of the downward weight of the rider applied on the pedals $r^4$ and the pull on the handle $r^3$ by hand a very powerful impulse may be applied to the rods $r^6$. Springs $r^7$ are employed to return the levers $r$ to their normal position after the propelling impulse has been made thereby.

The fork $d$ of the steering-wheel $e$ is connected with a cross-bar or yoke $d^2$ (see Fig. 2) above the platform $a$, the ends of which yoke are connected by links $d^3$ with a similar cross-bar $d^4$, connected with an upright shaft $d^5$, provided with a handle $d^{60}$, (see Fig. 1,) which extends rearward at about the middle of the vehicle and at a point of convenient access to the rider, so that by turning the said handle $d^{60}$ in one or the other direction the steering-wheel $e$ is turned and the vehicle directed as required.

In order to facilitate the running of the vehicle straight ahead without the attention of the operator, the yoke $d^4$ is provided with a locking-recess $d^{50}$, (see Fig. 2,) which may be engaged by a dog $d^6$, impelled toward said recess by a spring $d^7$, provided with an arm $d^8$, which may be pressed upon by the foot of the rider when desired to release the steering-yoke to change the direction of the vehicle from straight ahead. One or both of the levers $m$ is provided with a rigid arm $m^3$, extending forward and then outward, as will be understood from Fig. 1 and from Figs. 5 and 6, in which a portion of said lever $m$ and the arms $m^3$ are shown in front elevation. On the lateral outward extension of the arm $m^3$ is pivoted at $m^4$ an arm $m^5$, provided with a brake-shoe $m^6$ and with an operating projection $m^7$. The arm $m^3$ is provided with a pin or projection $m^8$, which supports the arm $m^5$ when turned to the position shown in Fig. 6, in which position the brake-shoe $m^6$ is brought in line with the periphery of the wheel $h$, so that by pulling back on the lever $m$ the brake is applied. The handle or operating-arm $m^7$ is then in convenient position to be engaged by the foot of the rider when desired to turn the brake-shoe back to the position shown in Fig. 5, so as not to interfere with the running of the vehicle. The brake-shoe is thus easily thrown into or out of position to engage with the wheel by the foot of the rider, and the brake is applied by the hand of the operator manipulating the lever $m$.

I claim—

1. A velocipede comprising the main supporting-wheels and steering-wheel, combined with two vibrating levers $i$ $i^2$, provided at their lower ends with push-rods, links connecting the said levers at opposite sides of their fulcrum, with a single actuating-lever in position to be operated by the rider of the vehicle, whereby a stroke of the actuating-lever in either direction produces a propelling impulse by one of the push-rods, substantially as described.

2. The combination of the body or main frame of the vehicle with a saddle, levers pivoted one at each side of and below the said saddle, provided with pedals below the saddle and handles at their upper ends, and push-rods connected with said levers, substantially as and for the purpose described.

3. The combination of the main body and supporting-wheels $h$ of the vehicle with the vibrating actuating-levers $m$, arms $m^3$ thereon, and brake-shoe pivotally connected with said arm, whereby it may be thrown into line with the periphery of the wheel or removed therefrom, substantially as described.

4. The combination of the steering-wheel and yoke connected therewith, provided with a locking-notch, with a spring-pressed dog co-operating with said notch and provided with a portion to be engaged by the foot of the operator, substantially as described.

In testimony whereof I have signed my name to this specification in the presence of two subscribing witnesses.

THOMAS M. KENNEY.

Witnesses:
JOS. P. LIVERMORE,
JAS. J. MALONEY.